United States Patent
Kawano et al.

[11] Patent Number: 5,808,618
[45] Date of Patent: Sep. 15, 1998

[54] THREE-DIMENSIONAL DISPLAYING APPARATUS HAVING FRAME BUFFER AND DEPTH BUFFER

[75] Inventors: Takeshi Kawano; Takuya Sayama, both of Osaka, Japan

[73] Assignee: Matsushita Electric Industrial Co., Ltd., Osaka, Japan

[21] Appl. No.: 546,400

[22] Filed: Oct. 20, 1995

[30] Foreign Application Priority Data

Oct. 21, 1994 [JP] Japan ................................ 6-256646
Jan. 19, 1995 [JP] Japan ................................ 7-006406

[51] Int. Cl.$^6$ ................................................ G06F 15/00
[52] U.S. Cl. ................................................ 345/422
[58] Field of Search ................................ 395/122, 131, 395/509; 345/139, 155, 419, 420, 421, 422

[56] References Cited

U.S. PATENT DOCUMENTS 4,855,938 8/1989 Gonzalez-Lopez et al. ............ 395/122

5,561,750 10/1996 Lentz ................................ 395/122

FOREIGN PATENT DOCUMENTS 1-7180 1/1989 Japan .

*Primary Examiner*—Phu K. Nguyen
*Attorney, Agent, or Firm*—McDermott, Will & Emery

[57] ABSTRACT

A depth buffer in a three-dimensional object displaying apparatus that stores compressed information on a Z value for each pixel. The Z value given to each pixel is compressed in accordance with a square root function or a logarithmic function. The compressed Z value is then stored in the depth buffer. In addition, the depth buffer is composed of a W-value buffer and a Z-value lookup table. The Z-value lookup table has entries of which one is designated by a W value such that a given Z value is stored therein, and the W-value buffer stores a W value for each pixel.

11 Claims, 11 Drawing Sheets

F I G. 12
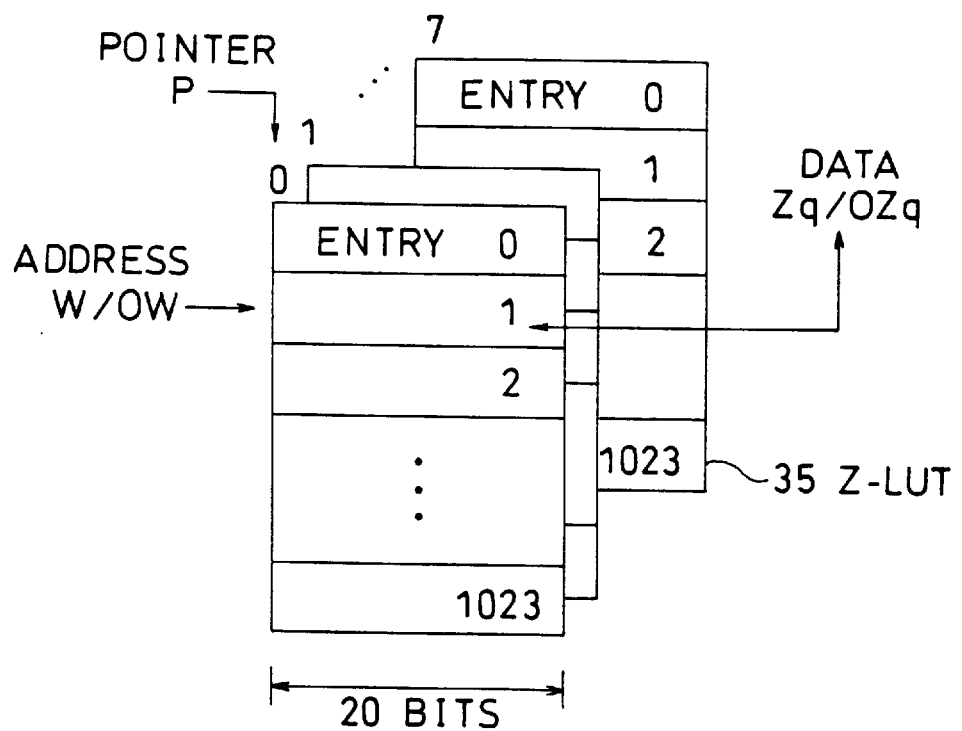

| OBJECT | P | Z-VALUE RANGE |
|---|---|---|
| 41 | 0 | 800,000 - 1,000,000 |
| 42 | 1 | 600,000 - 799,999 |
| 43 | 2 | 400,000 - 599,999 |
| 44 | 3 | 10,000 - 99,999 |
| 45 | 4 | 1,000 - 9,999 |

| OBJECT | P | Z-VALUE RANGE |
|---|---|---|
| 51, 52, 53 | 0 | 800,000 - 1,000,000 |
| 54, 55 | 1 | 10,000 - 99,999 |

THREE-DIMENSIONAL DISPLAYING APPARATUS HAVING FRAME BUFFER AND DEPTH BUFFER

BACKGROUND OF THE INVENTION

The present invention relates to a three-dimensional (3-D) object displaying apparatus which is well-known in the field of computer graphics. More particularly, it relates to an apparatus for accomplishing the display of a plurality of 3-D objects involving hidden surface elimination.

There have been known 3-D object displaying apparatus, each having a frame buffer and a depth buffer, as disclosed in U.S. Pat. No. 4,855,938 and in Japanese Laid-Open Patent Publication HEI 1-7180. With a conventional technique, in the case where a color image on a monitor is composed of 512×512 pixels, the frame buffer has a capacity of 512×512×24 bits and the depth buffer has a capacity of 512×512×20 bits. The frame buffer stores therein a 24-bit C value representing the color of one pixel at a location designated by a 9-bit X value and a 9-bit Y value. The depth buffer stores therein a 20-bit Z value representing the distance between a viewpoint and the pixel under consideration, i.e., the depth of the pixel. In the structure, when new C and Z values are generated for given X and Y values, an old Z value associated with an object already drawn, which has been stored at a location designated by the same X and Y values, is compared with the new Z value associated with another object to be drawn. The old Z value in the depth buffer is updated by the new Z value only when the new Z value is smaller than the old Z value, while the old C value stored at the corresponding location in the frame buffer is updated by the new C value, thereby accomplishing the display of a plurality of objects involving hidden surface elimination. However, the apparatus is extremely disadvantageous in that it requires a high-capacity memory of about 1.44 megabytes in total for the frame buffer and depth buffer.

SUMMARY OF THE INVENTION

It is therefore an object of the present invention to reduce the capacity of the depth buffer in the 3-D object displaying apparatus.

To attain the above object, the depth buffer of the present invention stores compressed information on a Z value for each pixel. Specifically, a 20-bit Z value given to each pixel is compressed to, e.g., a 10-bit Z value in accordance with a square root function, a logarithmic function, or the like and the compressed Z value is stored in the depth buffer. Alternatively, the depth buffer is composed of a W-value buffer and a Z-value lookup table. The Z-value lookup table has, e.g., 1024 entries, of which one is designated by a 10-bit W value such that a given 20-bit Z value is stored therein. The W-value buffer stores a 10-bit W value for each pixel. In this case, the same Z value can be designated by a plurality of different W values.

BRIEF DESCRIPTION OF THE DRAWINGS

FIG. 12 is a view illustrating a method of accessing a Z-value lookup table in FIG. 11;

DETAILED DESCRIPTION OF THE INVENTION

Below, 3-D object displaying apparatus according to the embodiments of the present invention will be described with reference to the drawings.

Figure 1:
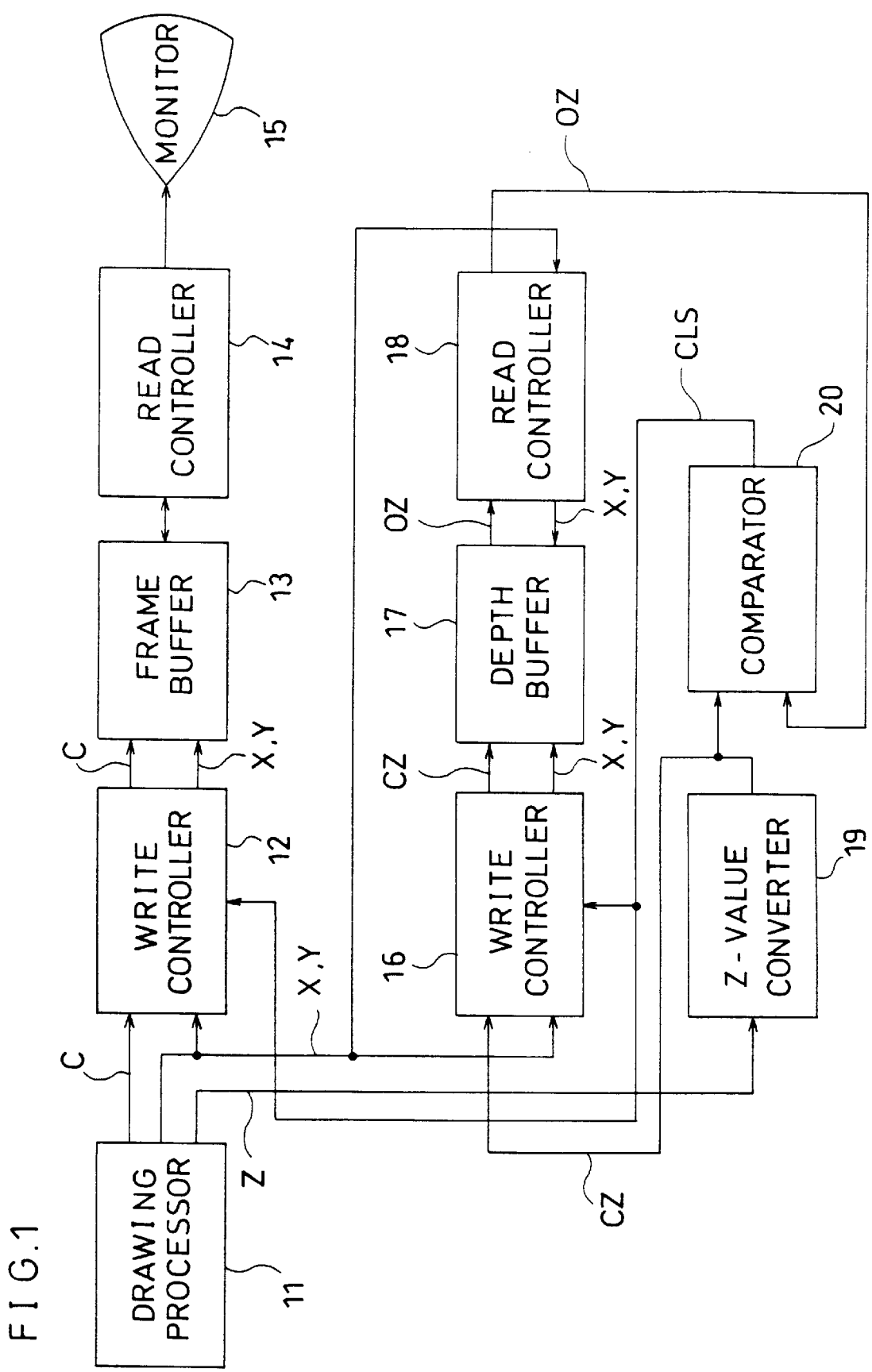
FIG. 1 is a block diagram showing the structure of a 3-D object displaying apparatus according to an embodiment of the present invention.

In FIG. 1 is shown the structure of an embodiment of the present invention comprising; a drawing processor 11; a frame buffer 13; a monitor 15; and a depth buffer 17. A first write controller 12 and a first read controller 14 are provided for the frame buffer 13. On the other hand, a second write controller 16 and a second read controller 18 are provided for the depth buffer 17. In FIG. 1 are also shown a Z-value converter 19 and a comparator 20.

The drawing processor 11 is for generating, for each 3-D object and for each pixel composing one 3-D object, a 24-bit C value representing the color of one pixel, a 9-bit X value representing the x-coordinate of the pixel on a monitor 15, a 9-bit Y value representing the y-coordinate of the pixel on the monitor 15, and a 20-bit Z value representing the depth of the pixel. The generated 24-bit C value consists of an 8-bit R (red) value, an 8-bit G (green) value, and an 8-bit B (blue) value. The C value is supplied to the first write controller 12. The X and Y values are supplied to the first and second write controllers 12 and 16 and to the second read controller 18. The Z value is supplied to the Z-value converter 19.

The 20-bit Z value generated by the drawing processor 11 is compressed to a 10-bit Z value by the Z-value converter 19. The compressed Z value (CZ) is given to the second write controller 16 and to the comparator 20.

The depth buffer 17 has a capacity of 512×512×10 bits and stores the compressed Z value at a location designated by the X and Y values. The capacity of the depth buffer 17 has been reduced to one half of the capacity of a conventional depth buffer. The frame buffer 13 has a capacity of 512×512×24 bits, similarly to a conventional frame buffer, and stores the C value at a location designated by the X and Y values.

The second read controller 18 reads out an old Z value (OZ) stored at the location designated by the X and Y values in the depth buffer 17. The read Z value is supplied to the comparator 20. The comparator 20 compares the generated Z value with the old Z value (each of which has been compressed to 10 bits) and asserts, only when the generated Z value is smaller than the old Z value, an enable signal CLS indicating that the pixel of another object to be drawn is closer to a viewpoint than the pixel of an object already drawn.

The second write controller 16 stores, only when the enable signal CLS has been asserted, the generated and compressed Z value (CZ) at the location designated by the X and Y values in the depth buffer 17. The first write controller 12 stores, only when the enable signal CLS has been asserted, the generated C value at the location designated by the X and Y values in the frame buffer 13. The first read controller 14 reads the C value stored in the frame buffer 13 and displays a pixel having a color corresponding to the read C value on the monitor 15.

Figure 2:
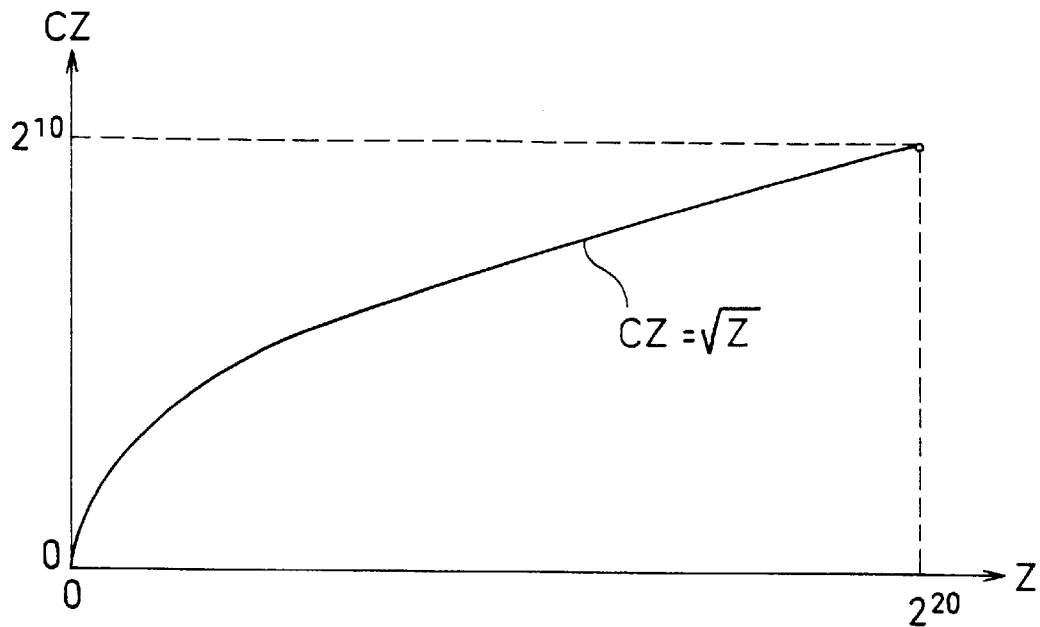
FIG. 2 is a graph showing an example of a conversion function implemented by a Z-value converter in FIG. 1.

FIG. 2 shows an example of a conversion function implemented by the Z-value converter 19. The conversion function shown in FIG. 2 is a square root function $CZ=\sqrt{Z}$. As an object is closer to the viewpoint, an area occupied by the drawn object is increased. As an object is farther from the viewpoint, on the other hand, the area occupied by the drawn object is decreased. Therefore, it is desirable to keep the compression rate for the smaller Z value lower than the compression rate for the larger Z value. The square root function is one of the conversion functions each having the foregoing characteristic. In FIG. 2, the horizontal axis represents the Z values, while the vertical axis represents the compressed Z values (CZ). A 20-bit Z value is compressed to 10 bits in accordance with the square root function.

In the initial state of the apparatus shown in FIG. 1, for example, each of the 512×512 contents of the frame buffer 13 is set to a value representing a background color, while each of the 512×512 contents of the depth buffer 17 is set to a maximum value 1023 ($=2^{10}-1$). In this state, it is assumed that the drawing processor 11 has generated a value representing "red," 0, 0, and 65536 as the C value, X value, Y value, and Z value, respectively, for one pixel of a given object. The Z-value converter 19 supplies 256 as the compressed Z value (CZ). The second read controller 18 reads out 1023 as the old Z value (OZ) stored at a location designated by the X and Y values (X=0 and Y=0) in the depth buffer 17. The comparator 20 asserts the enable signal CLS depending on the result of comparison between the compressed Z value (256) and the old Z value (1023). Consequently, the first write controller 12 stores the generated C value (value representing "red") at a location designated by the X and Y values (X=0 and Y=0) in the frame buffer 13. On the other hand, the second write controller 16 stores the compressed Z value (256) at the location designated by the X and Y values (X=0 and Y=0) in the depth buffer 17. In this manner, one C value in the frame buffer 13 and one Z value in the depth buffer 17 corresponding thereto are updated. Similar procedures will be performed for the other pixels of the same object.

Subsequently, it is assumed that the drawing processor 11 has generated a value representing "blue," 0, 0, and 90000 as the C value, X value, Y value, and Z value for one pixel of another object. In this case, the new Z value and old Z value supplied to the comparator 20 are 300 and 256, respectively. Consequently, the enable signal CLS is not asserted, so that the frame buffer 13 and the depth buffer 17 are not updated. After repeating similar procedures, the display of a plurality of objects involving hidden surface elimination will be accomplished on the monitor 15.

Figure 3:
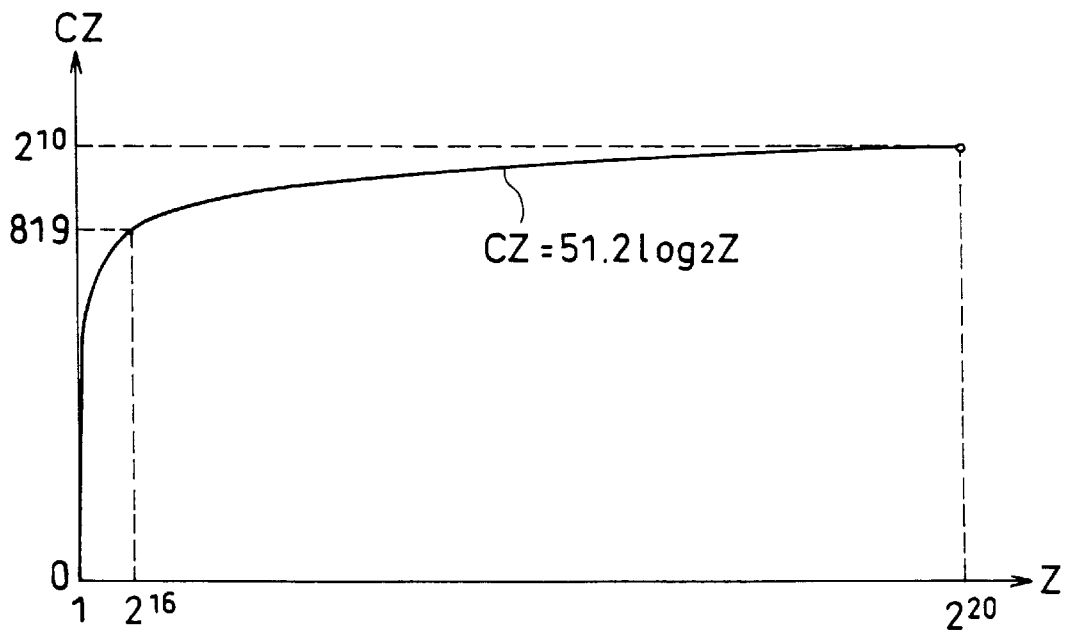
FIG. 3 is a graph showing another example of the conversion function implemented by the Z-value converter in FIG. 1.
Figure 4:
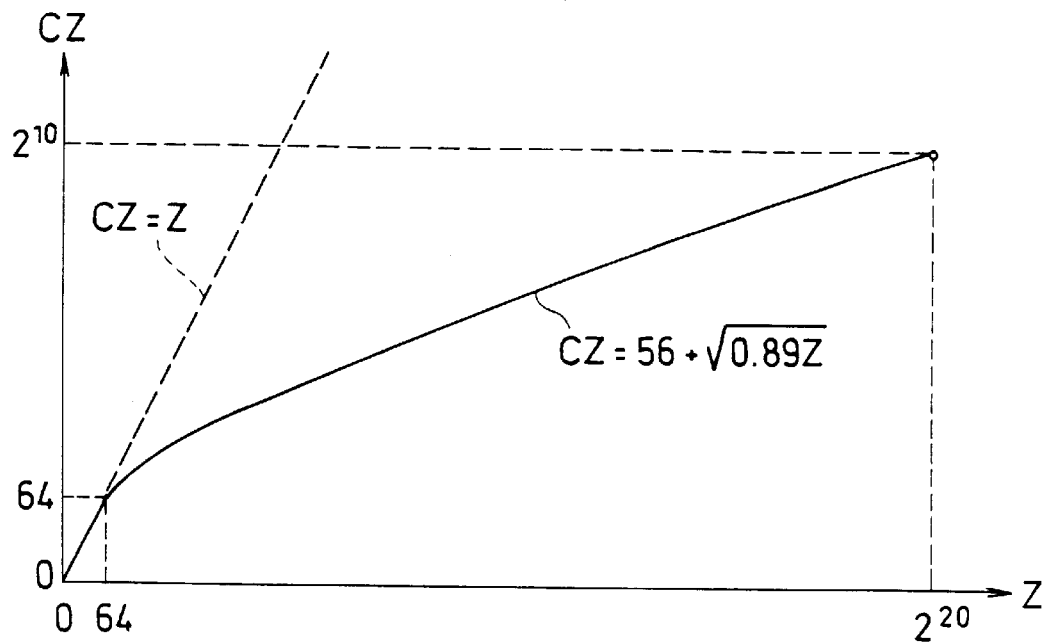
FIG. 4 is a graph showing still another example of the conversion function implemented by the Z-value converter in FIG. 1.

FIGS. 3 and 4 show other examples of the conversion function. The conversion function shown in FIG. 3 is a logarithmic function $CZ=51.2\times\log_2 Z$. The conversion function shown in FIG. 4 is a linear function $CZ=Z$ in a range where $Z<64$, while it is a square root function $CZ=56+\sqrt{(0.89Z)}$ in a range where $Z\geq 64$. With each of the conversion function, a 20-bit Z value is compressed to 10 bits.

Figure 5:
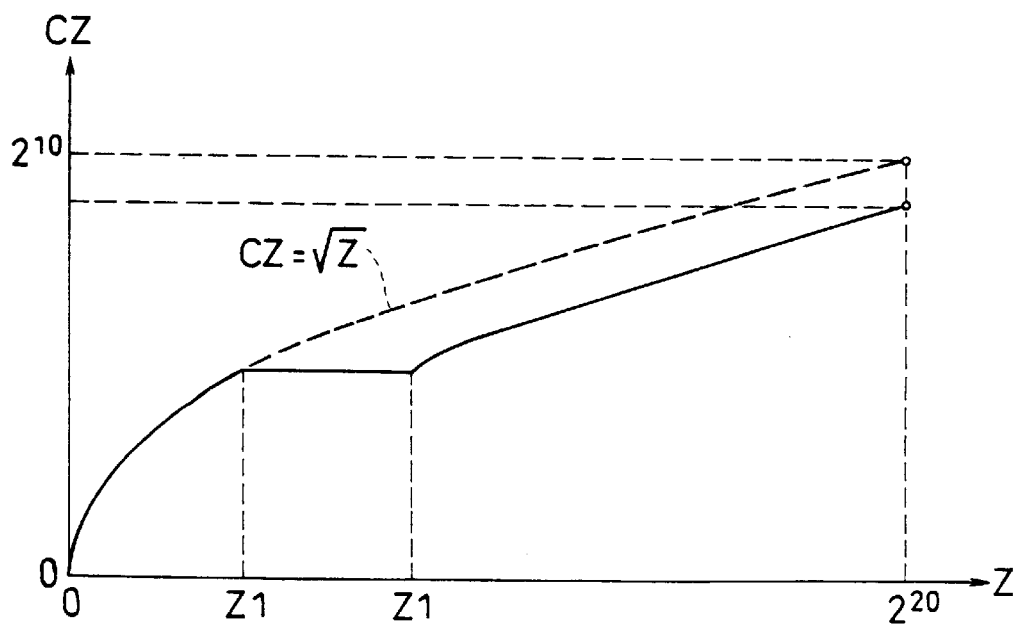
FIG. 5 is a graph showing still another example of the conversion function implemented by the Z-value converter in FIG. 1.

FIG. 5 shows still another example of the conversion function. The conversion function shown in FIG. 5 is obtained by partially shifting the square root function $CZ=\sqrt{Z}$ of FIG. 2 along the horizontal axis such that the CZ does not vary in a given range of Z values (from Z1 to Z2). With the conversion function of FIG. 5, a 20-bit Z value can be compressed to 9 bits or less. The conversion function is effective when no object has previously been found in a given depth range.

To implement each of the above conversion functions, there have been practiced a method of gradually reducing the error of an approximate solution through repetitive calculations and a method of providing the result of conversion in the form of a lookup table.

Figure 6:
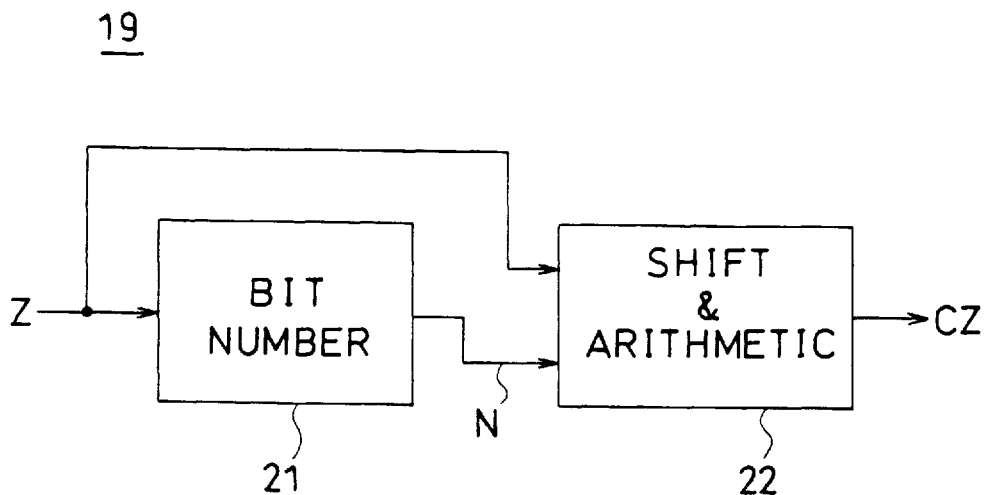
FIG. 6 is a block diagram showing an example of the internal structure of the Z-value converter in FIG. 1.
Figure 7:
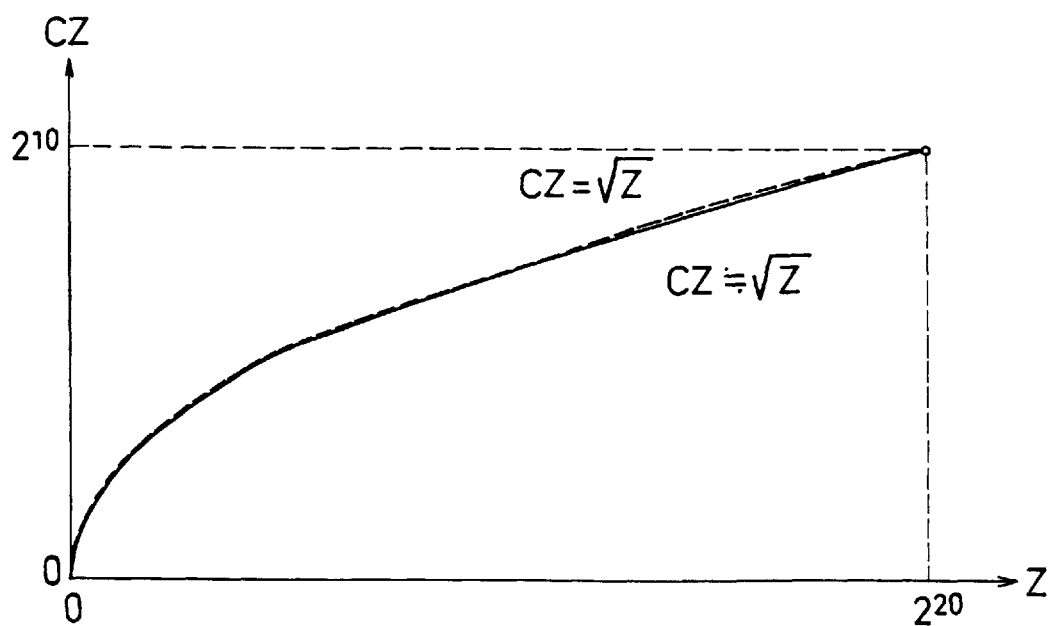
FIG. 7 is a graph showing an example of the conversion function implemented by the Z-value converter having the internal structure of FIG. 6.

FIG. 6 shows an example of the internal structure of the Z-value converter 19 for approximating the square root function $CZ=\sqrt{Z}$ by a piecewise linear function. In FIG. 6 are shown: a bit-number calculator 21; and a shift and arithmetic unit 22. The bit-number calculator 21 supplies a maximum integer N equal to or smaller than one half of the number of bits which are necessary and sufficient to represent a given Z value in binary code. The shift and arithmetic unit 22 adds an integer ($2\times 2^N$) obtained by upwardly shifting a constant 2 by the number of bits indicated by the integer N to an integer ($Z/2^N$) obtained by downwardly shifting a given Z value by the number of bits indicated by the integer N, divides the addition result by 3, and supplies the obtained value as the compressed Z value (CZ). For instance, when Z=65536, N=8 and CZ=256 are obtained. FIG. 7 shows a square root function approximated by a piecewise linear function in the Z-value converter 19 of FIG. 6. With the Z-value converter 19 of FIG. 6, hardware for compressing a Z value can be simplified.

Figure 8:
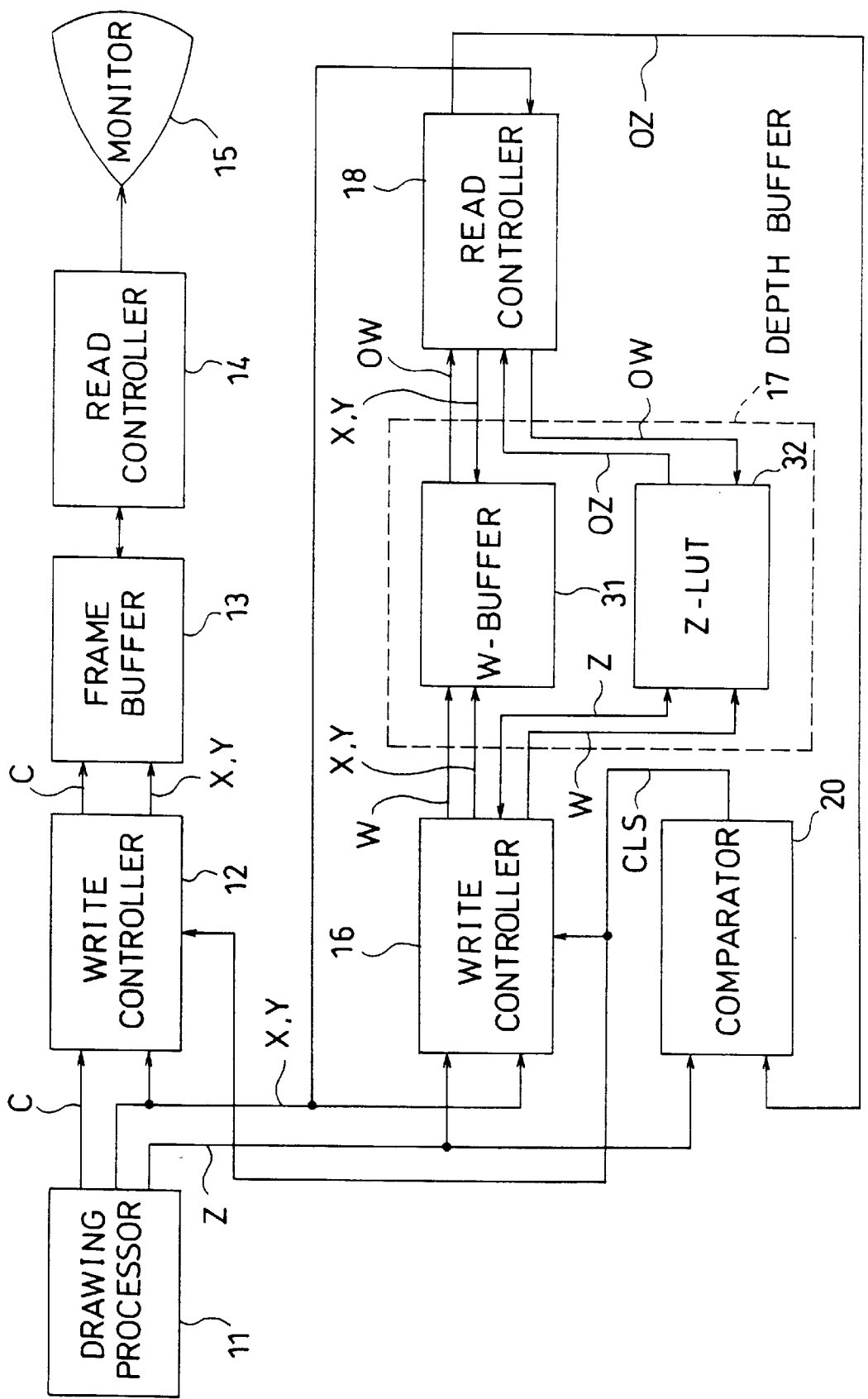
FIG. 8 is a block diagram showing the structure of the 3-D object displaying apparatus according to another embodiment of the present invention.
Figure 9:
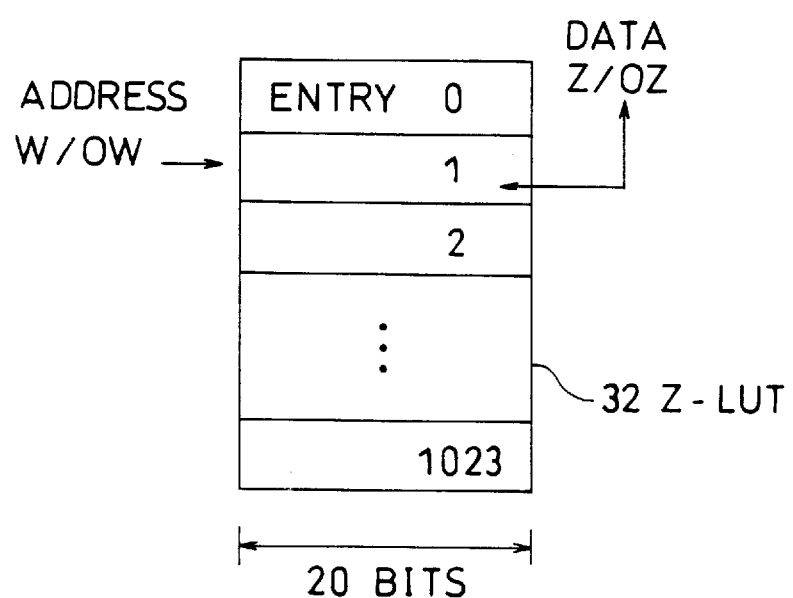
FIG. 9 is a view illustrating a method of accessing a Z-value lookup table in FIG. 8.

FIG. 8 shows the structure of another embodiment of the present invention. The structure of FIG. 8 is different from the structure of FIG. 1 in that the Z-value converter 19 of FIG. 1 is eliminated so as to supply the Z value generated by the drawing processor 11 directly to the second write controller 16 and to the comparator 20. The structure of FIG. 8 is characterized in that the depth buffer 17 comprises a W-value buffer 31 and a Z-value lookup table 32. As shown in FIG. 9, the Z-value lookup table 32 has 1024 entries numbered 0 to 1023. Each of the entries has a bit length of 20. Accordingly, the Z-value lookup table 32 has a capacity of 1024×20 bits and stores a 20-bit Z value in that one of the entries which has been designated by a 10-bit W value. The W-value buffer 31 has a capacity of 512×512×10 bits and stores a W value at a location designated by X and Y values. The total capacity of the W-value buffer 31 and Z-value lookup table 32 has been reduced to a value slightly higher than one half of the capacity of the conventional depth buffer.

The second read controller 18 reads out an old W value (OW) stored at the location designated by the X and Y values in the W-value buffer 31 and reads out an old Z value (OZ) stored in an entry designated by the old W value (OW) in the Z-value lookup table 32. The read old Z value is supplied to the comparator 20. The comparator 20 compares the generated Z value with the old Z value and asserts the enable signal CLS only when the generated Z value is smaller than the old Z value.

The second write controller 16 stores the generated Z value in any entry of the Z-value lookup table 32 and stores the W value designating the entry in the W-value buffer 31 only when the enable signal CLS has been asserted. Specifically, it is initially examined whether or not a Z value that is the same as the generated Z value is stored in any entry of the Z-value lookup table 32. In the case where no Z value that is the same as the generated Z value is stored in any entry of the Z-value lookup table 32, the generated Z value is stored in one of the vacant entries of the Z-value lookup table 32, while the W value designating the entry is stored at the location designated by the X and Y values in the W-value buffer 31. In the case where a Z value that is the same as the generated Z value is stored in any entry, the Z value is not doubly stored in the Z-value lookup table 32. Instead, the W value designating the entry in which a Z value that is the same as the generated Z value has been stored is stored at the location designated by the X and Y values in the W-value buffer 31.

As for the functions of the first write controller 12 and first read controller 14, they are the same as in the structure of FIG. 1.

In the initial state of the apparatus of FIG. 8, e.g., each of the 512×512 contents of the frame buffer 13 is set to a value representing a background color and each of the 512×512 contents of the W-value buffer 31 is set to a W value designating the entry 0, while the content of the entry 0 of the Z-value lookup table 32 is set to a maximum value of 1048575 (=$2^{20}$–1). The entry 1 through entry 1023 of the Z-value lookup table 32 are vacant. In this state, it is assumed that the drawing processor 11 has generated, for one pixel of a given object, a value representing "red," 0, 0, and 300 as the C value, X value, Y value, and Z value. The second read controller 18 reads out the W value designating the entry 0 as the old W value (OW) stored at the location designated by the X and Y values (X=0 and Y=0) in the W-value buffer 31. The second read controller 18 further reads out 1048575 as the old Z value (OZ) stored in the entry 0 of the Z-value lookup table 32. The comparator 20 asserts the enable signal CLS depending on the result of comparison between the generated Z value (300) and the old Z value (1048575). Consequently, the first write controller 12 stores the generated C value (value representing "red") at the location designated by the X and Y values (X=0 and Y=0) in the frame buffer 13. On the other hand, the second write controller 16 stores the generated Z value (300) in the entry 1 of the Z-value lookup table 32, while it stores the W value designating the entry 1 at the location designated by the X and Y values (X=0 and Y=0) in the W-value buffer 31. In this manner, one C value in the frame buffer 13 and one W value in the W-value buffer 31 corresponding thereto are updated, while the content of the Z-value lookup table 32 is updated. Similar procedures will be performed with respect to the other pixels of the same object.

Subsequently, it is assumed that the drawing processor 11 has generated, for one pixel of another object, a value representing "blue," 0, 0, and 900 as the C value, X value, Y value, and Z value. In this case, the new Z value and old Z value supplied to the comparator 20 are 900 and 300, respectively. Consequently, the enable signal CLS is not asserted and the frame buffer 12, W-value buffer 31, and Z-value lookup table 32 are not updated. After repeating similar procedures, the display of a plurality of objects involving hidden surface elimination will be accomplished on the monitor 15.

Figure 10:
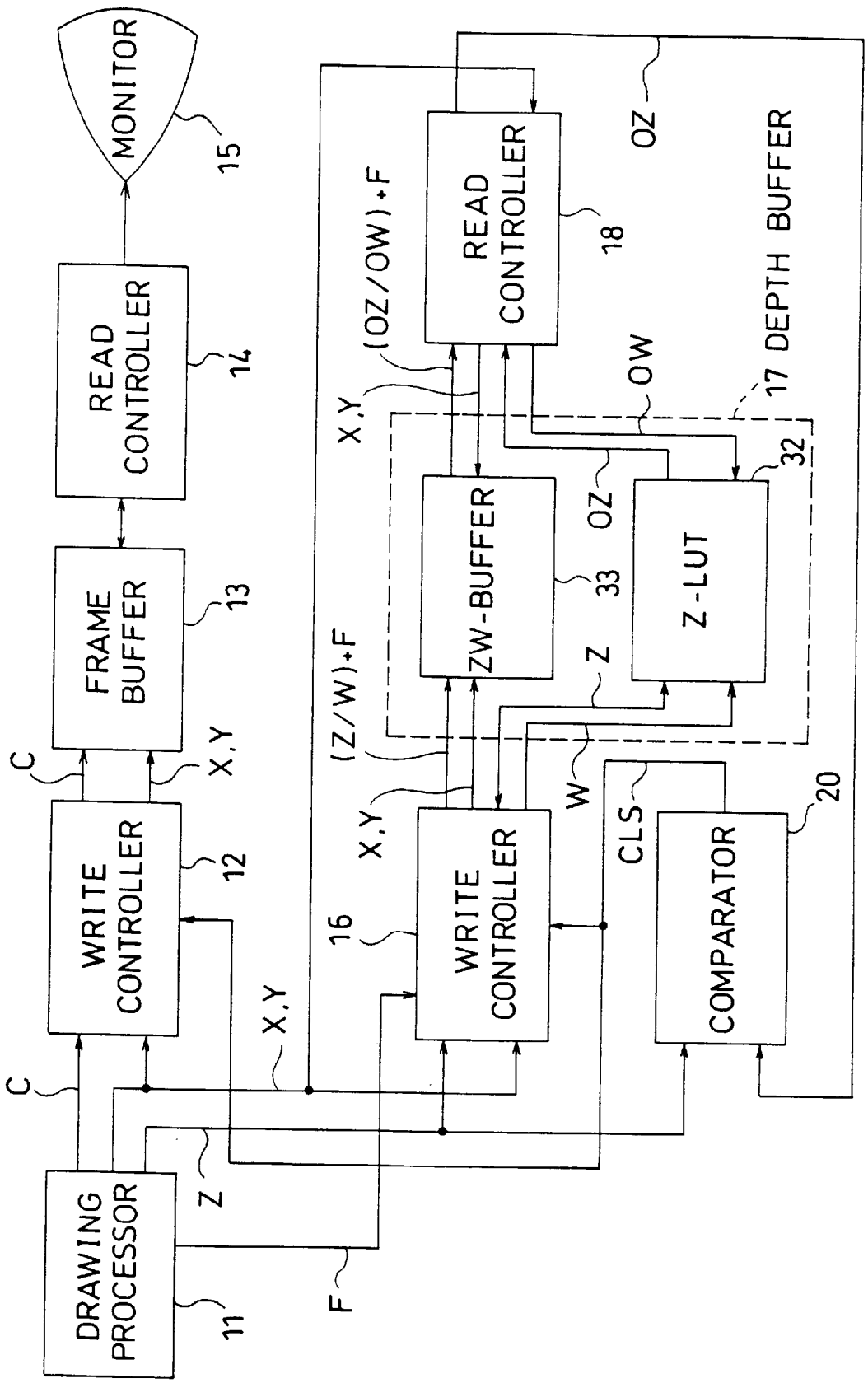
FIG. 10 is a block diagram showing the structure of a 3-D object displaying apparatus according to still another embodiment of the present invention.

FIG. 10 shows the structure of still another embodiment of the present invention. The structure of FIG. 10 is different from the structure of FIG. 8 in that the W-value buffer 31 in FIG. 8 is replaced by a ZW-value buffer 33. The ZW-value buffer 33 has a capacity of 512×512×11 bits and stores, when a F value given as a 1-bit flag is 0, a 10-bit W value and the F value of 0 at a location designated by X and Y values and stores, when the given F value is 1, a 10-bit Z value and the F value of 1 at the location designated by the X and Y values. The Z-value lookup table 32 has a capacity of 1024×20 bits, similarly to the case of FIG. 8. Accordingly, the total capacity of the ZW-value buffer 33 and Z-value lookup table 32 has been reduced to about 55% of the capacity of the conventional depth buffer.

The drawing processor 11 generates the 1-bit F value in addition to a 24-bit C value, the 9-bit X value, the 9-bit Y value, and a 20-bit Z value. The F value is set to 1 when each of the upper 10 bits of the Z value is 0. Otherwise, the F value is set to 0. The generated F value is supplied to the second write controller 16.

The second read controller 18 reads out the old Z value (OZ) or old W value (OW) stored at the location designated by the X and Y values in the ZW-value buffer 33 in conjunction with the F value. When the read F value is 1, the old Z value (OZ) read from the ZW-value buffer 33 is supplied to the comparator 20. When the read F value is 0, the old Z value (OZ) stored in the entry of the Z-value lookup table 32 which has been designated by the old W value (OW) read from the above ZW-value buffer 33 is read out and supplied to the comparator 20. The comparator 20 compares the generated Z value with the old Z value and asserts the enable signal CLS only when the generated Z value is smaller than the old Z value.

The second write controller 16 stores the generated Z value in the depth buffer 17 only when the enable signal CLS has been asserted by the comparator 20. Specifically, when the F value supplied from the drawing processor 11 is 0, the generated 20-bit Z value is stored in any entry of the Z-value lookup table 32, while the W value designating the entry is stored at the location designated by the X and Y values in conjunction with the F value of 0 in the ZW-value buffer 33. When the F value supplied from the drawing processor 11 is 1, the lower 10 bits of the 20-bit generated Z value, in conjunction with the F value of 1, are stored at the location designated by the X and Y values in the ZW-value buffer 33.

In the apparatus of FIG. 10, the depth buffer 17 can be accessed at a higher speed, since the Z-value lookup table 32 is used less frequently than in the apparatus of FIG. 8.

Figure 11:
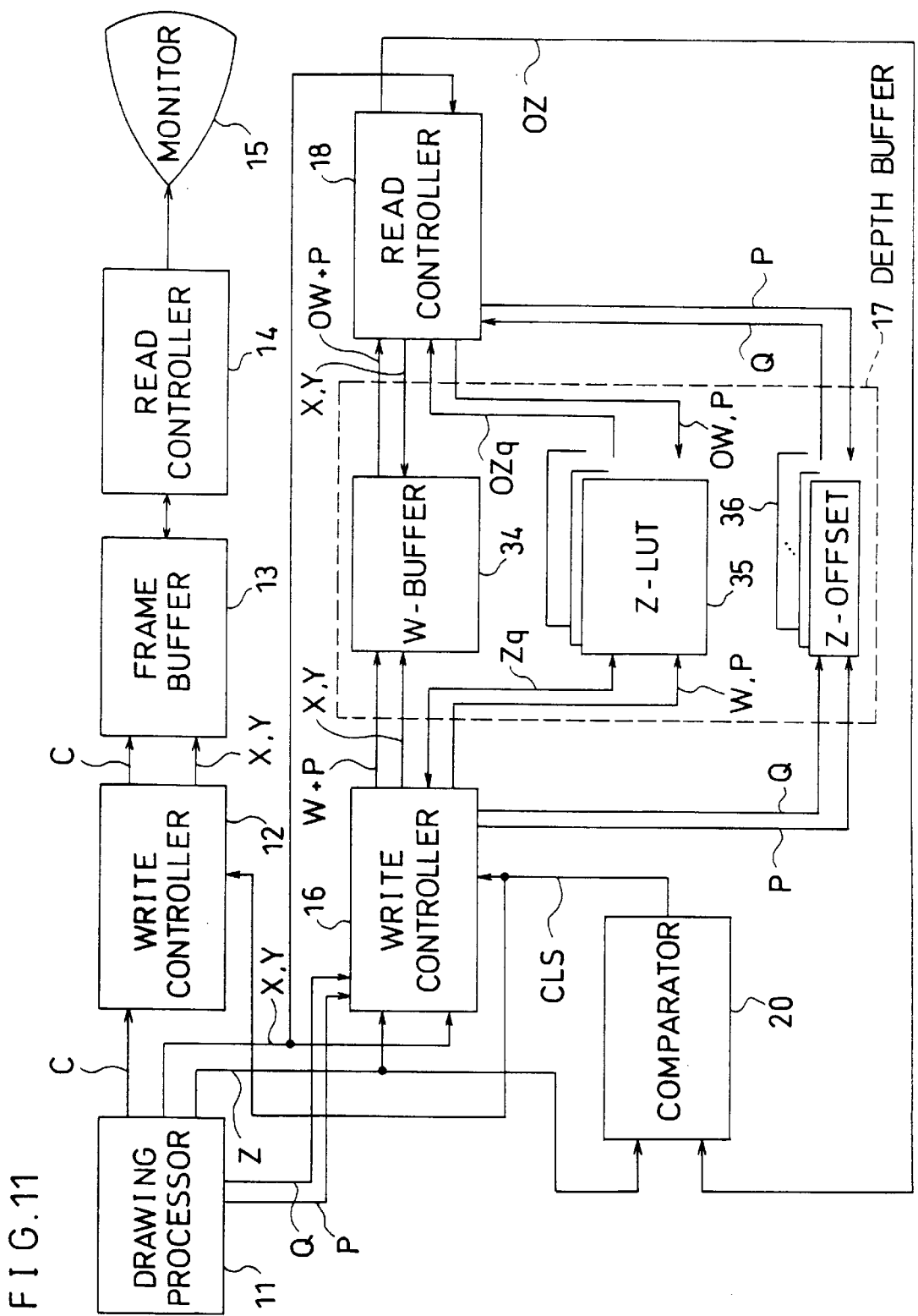
FIG. 11 is a block diagram showing the structure of the 3-D object displaying apparatus according to still another embodiment of the present invention.

FIG. 11 shows still another embodiment of the present invention. The structure of FIG. 11 is different from the structure of FIG. 8 in that the Z-value lookup table 35 is composed of 8 small tables. As shown in FIG. 12, each of the small tables has 1024 entries. The bit length of each of the entries is 20. Briefly, the Z-value lookup table 35 has a capacity of 8×1024×20 bits and stores a 20-bit modified Z value (Zq) in one entry designated by the 10-bit W value in one small table designated by a P value given as a 3-bit pointer. The W-value buffer 34 has a capacity of 512×512× 13 bits and stores the 3-bit P value in conjunction with the 10-bit W value at the location designated by the X and Y values. In FIG. 11, a Z-value offset memory 36 composed of 8 small memories corresponding to the respective 8 small tables of the Z-value lookup table 35 is further provided in the depth buffer 17. The Z-value offset memory 36 has a capacity of 8×20 bits and stores a Q value given as a 20-bit offset value in one of the small memories designated by the 3-bit P value. The above modified Z value (Zq) is obtained by subtracting the Q value from the generated Z value. The Q value stored in one small memory of the Z-value offset memory 36 is used in common by a plurality of modified Z values stored in the corresponding small table of the Z-value lookup table 35. The total capacity of the W-value buffer 34, Z-value lookup table 35, and Z-value offset memory 36 has been reduced to about 68% of the capacity of the conventional depth buffer.

The drawing processor 11 supplies, for each object, a 3-bit P value and a 20-bit Q value to the second write controller 16. The second write controller 16 executes the setting of the Q value for each of the small memories of the Z-value offset memory 36. Moreover, the drawing processor 11 also generates, for each pixel, a 3-bit P value in addition to a 24-bit C value, a 9-bit X value, a 9-bit Y value, and a 20-bit Z value. The generated P value is supplied in conjunction with the X, Y, and Z values to the second write controller 16.

Figures 13A, 13B:
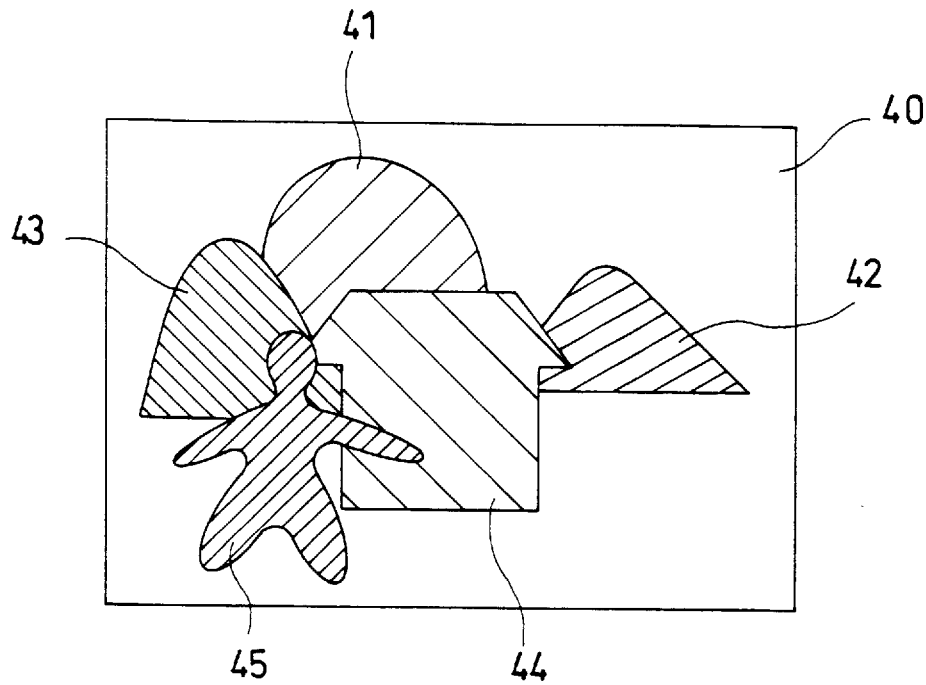
FIG. 13A is a view illustrating a plurality of 3-D objects displayed by the apparatus of FIG. 11.
FIG. 13B is a table showing an example of the assignment of the 3-D objects to small tables composing the Z-value lookup table in FIG. 11.

FIG. 13A is a view illustrating a plurality of objects displayed by the apparatus of FIG. 11. FIG. 13B shows an example of the assignment of the objects to the small tables. In FIG. 13A, five 3-D objects 41, 42, 43, 44, and 45 are drawn anterior to a background 40 at infinity. In FIG. 13B, the object 41 positioned farthest is assigned to that one of the 8 small tables of the Z-value lookup table 35 which has been designated by the P value of 0. The range of the Z values belonging to the pixel of the object 41 is limited to 800000 to 1000000. Consequently, 800000 is stored as the Q value in that one of the 8 small memories of the Z-value offset memory 36 which has been designated by the P value of 0. The other four objects 42, 43, 44, and 45 are also assigned to the separate small tables. The content of the entry 0 in the small table designated by the P value of 0 is initialized to 248575, which is a value obtained by subtracting 800000 from the maximum Z value 1048575 ($=2^{20}-1$) and which represents a modified Z value of the pixel of the background 40.

The second read controller 18 reads out the old W value (OW) stored at the location designated by the X and Y values in the W-value buffer 34 in conjunction with the P value. The second read controller 18 also reads out an old modified Z value (OZq) stored in an entry designated by the old W value (OW) in that one of the 8 small tables of the Z-value lookup table 35 which has been designated by the P value, while reading out the Q value stored in that one of the 8 small memories of the Z-value offset memory 36 which has been designated by the P value. Moreover, the second read controller 18 obtains the old Z value (OZ) by adding up the old modified Z value (OZq) and the Q value, each of which has been read out. The obtained old Z value is supplied to the comparator 20. The comparator 20 compares the generated Z value with the old Z value and asserts the enable signal CLS only when the generated Z value is smaller than the old Z value.

The second write controller 16 obtains a modified Z value (Zq) by subtracting the Q value from the generated Z value only when the enable signal CLS has been asserted by the comparator 20. Furthermore, the second write controller 16 examines whether or not a Z value that is the same as the modified Z value is stored in any entry of the small table of the Z-value lookup table 35 which has been designated by the P value. In the case where no Z value that is the same as the modified Z value is stored in any entry, the modified Z value is stored in one of the vacant entries of the small table of the Z-value lookup table 35 which has been designated by the P value, with the result that the W value designating the entry is stored in conjunction with the P value at the location designated by the X and Y values in the W-value buffer 34. In the case where a Z value that is the same as the modified Z value is stored in any entry, the Z value is not doubly stored in the Z-value lookup table 35, so that the W value designating the entry in which the Z value that is the same as the modified Z value has been stored is stored in conjunction with the P value at the location designated by the X and Y values in the W-value buffer 34.

Figures 14A, 14B:
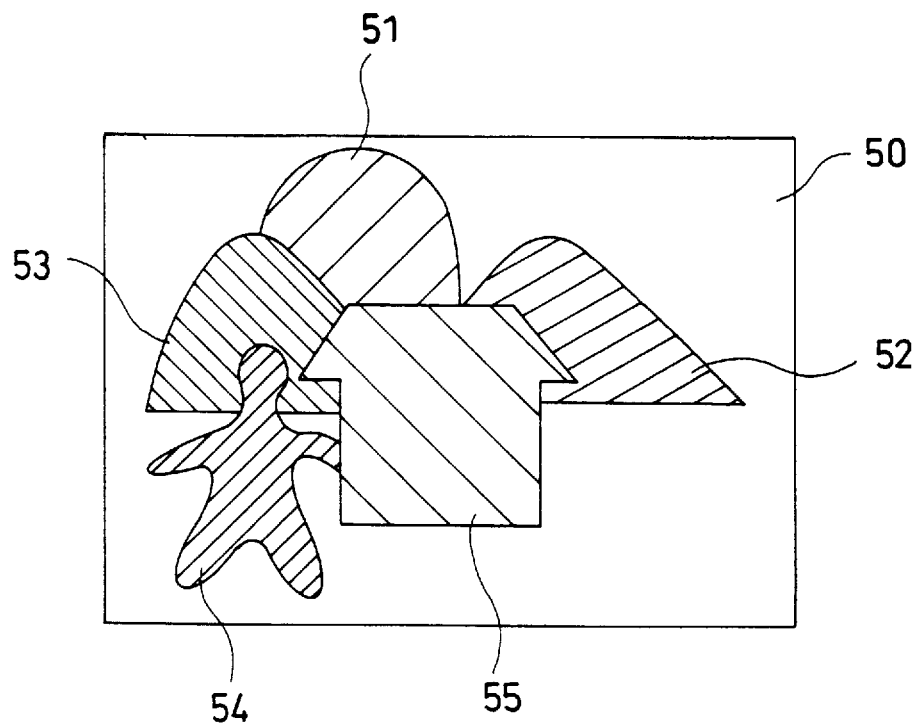
FIG. 14A is a view illustrating other 3-D objects displayed by the apparatus of FIG. 11.
FIG. 14B is a table showing another example of the assignment of the 3-D objects to the small tables composing the Z-value lookup table in FIG. 11.

FIG. 14A is a view illustrating other objects displayed by the apparatus of FIG. 11. FIG. 14B shows another example of the assignment of the objects to the small tables. In FIG. 14A, five 3-D objects 51, 52, 53, 54, and 55 are drawn anterior to a background 50 at infinity. The three objects 51, 52, and 53 constitute a first group, while the other two objects 54 and 55 constitute a second group. In FIG. 14B, the three objects 51, 52, and 53 constituting the first group are collectively assigned to that one of the 8 small tables of the Z-value lookup table 35 which has been designated by the P value of 0. On the other hand, the two objects 53 and 54 constituting the second group are collectively assigned to that one of the 8 small tables of the Z-value lookup table 35 which has been designated by the P value of 1.

Instead of the Z-value lookup table 32 provided in conjunction with the ZW-value buffer 33 in the depth buffer 17 in FIG. 10, it is also possible to use the Z-value lookup table 35 composed of the plurality of small tables and the Z-value offset memory 36 composed of the plurality of small memories, as shown in FIG. 11.

We claim:

1. A three-dimensional object displaying apparatus comprising:

a drawing processor for generating, for each three-dimensional object and for each pixel composing one three-dimensional object, a C value representing a color of one pixel, X and Y values representing a two-dimensional location of the pixel, and a Z value representing a depth of the pixel;

a frame buffer for storing said generated C value therein;

a first write controller for storing, only when an enable signal has been asserted, said generated C value at a location designated by said generated X and Y values in said frame buffer;

a first read controller for reading out the C value stored in said frame buffer;

a monitor for displaying the pixel having the color corresponding to said read C value;

a Z-value converter for converting said generated Z value to a compressed Z value having a bit length smaller than a bit length of said generated Z value;

a depth buffer for storing said compressed Z value therein;

a second read controller for reading out an old Z value stored at a location designated by said generated X and Y values in said depth buffer;

a comparator for comparing said generated and compressed Z value with said read old Z value and asserting said enable signal only when said generated and compressed Z value is smaller than said read old Z value; and a second write controller for storing, only when said enable signal has been asserted, said generated and compressed Z value at the location designated by said generated X and Y values in said depth buffer.

2. A three-dimensional object displaying apparatus according to claim 1, wherein said Z-value converter converts said generated Z value to said compressed Z value in accordance with a square root function.

3. A three-dimensional object displaying apparatus according to claim 1, wherein said Z-value converter converts said generated Z value to said compressed Z value in accordance with a logarithmic function.

4. A three-dimensional object displaying apparatus according to claim 1, wherein said Z-value converter converts said generated Z value to said compressed Z value in accordance with a function in which a given range of Z values including a minimum value thereof is represented by a straight line with a gradient of 1.

5. A three-dimensional object displaying apparatus according to claim 1, wherein said Z-value converter converts said generated Z value to said compressed Z value in accordance with a function in which a given range of Z values is represented by a straight line with a gradient of 0.

6. A three-dimensional object displaying apparatus according to claim 1, wherein said Z-value converter converts said generated Z value to said compressed Z value in accordance with a piecewise linear function.

7. A depth buffer for use in a three-dimensional object displaying apparatus, said depth buffer comprising:

a Z-value lookup table having a plurality of entries so as to store a given Z value in that one of said plurality of entries which has been designated by a W value having a bit length smaller than a bit length of the given Z value; and a W-value buffer for storing said W value at a location designated by given X and Y values therein.

8. A depth buffer for use in a three-dimensional object displaying apparatus, said depth buffer comprising:

a Z-value lookup table having a plurality of entries so as to store a given Z value in that one of said plurality of entries which has been designated by a W value having a bit length smaller than a bit length of the given Z value; and a ZW-value buffer for storing, when a given F value is 0, said W value and said F value of 0 at a location designated by given X and Y values therein and storing, when the given F value is 1, said given Z value and said F value of 1 at the location designated by the given X and Y values therein.

9. A depth buffer for use in a three-dimensional object displaying apparatus, said depth buffer comprising:

a Z-value lookup table having a plurality of small tables, each of said plurality of small tables having a plurality entries, so as to store a value obtained by subtracting a given offset value from a given Z value in that one of said plurality of entries which has been designated by a W value having a bit length smaller than a bit length of said given Z value in that one of said plurality of small tables designated by a P value;

a Z-value offset memory having a plurality of small memories corresponding to the plurality of small tables of said Z-value lookup table so as to store said given offset value in that one of said plurality of small memories which has been designated by said given P value; and a W-value buffer for storing said given P value in conjunction with said W value at a location designated by given X and Y values therein.

10. A depth buffer according to claim 9, wherein different three-dimensional objects are separately assigned to the plurality of small tables composing said Z-value lookup table.

11. A depth buffer according to claim 9, wherein a plurality of three-dimensional objects are collectively assigned to at least one of the plurality of small tables composing said Z-value lookup table.

* * * * *